United States Patent
Lee

(10) Patent No.: US 6,948,081 B2
(45) Date of Patent: Sep. 20, 2005

(54) APPARATUS AND METHOD FOR CONSERVING POWER IN A MONITOR

(75) Inventor: Eun-bae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 10/058,735

(22) Filed: Jan. 30, 2002

(65) Prior Publication Data

US 2003/0014675 A1 Jan. 16, 2003

(30) Foreign Application Priority Data

Jul. 14, 2001 (KR) .......................................... 2001-42599

(51) Int. Cl.⁷ .............................................. G09G 5/00
(52) U.S. Cl. ...................................................... 713/310
(58) Field of Search ................................. 713/200, 310

(56) References Cited

U.S. PATENT DOCUMENTS

| | | | | |
|---|---|---|---|---|
| 5,375,245 A | * | 12/1994 | Solhjell et al. | ............. 713/320 |
| 5,880,719 A | * | 3/1999 | Kikinis | ....................... 345/212 |
| 5,890,217 A | * | 3/1999 | Kabemoto et al. | ........... 711/141 |
| 5,961,647 A | * | 10/1999 | Kim et al. | ................... 713/300 |
| 6,035,358 A | * | 3/2000 | Tanikawa | ..................... 710/310 |
| 6,108,764 A | * | 8/2000 | Baumgartner et al. | ......... 712/28 |
| 6,141,762 A | * | 10/2000 | Nicol et al. | .................. 713/300 |
| 6,598,108 B1 | * | 7/2003 | Ashida et al. | ............... 710/305 |
| 6,711,691 B1 | * | 3/2004 | Howard et al. | .............. 713/300 |
| 2004/0125753 A1 | * | 7/2004 | Mahany et al. | .............. 370/254 |

* cited by examiner

*Primary Examiner*—John R. Cottingham
(74) *Attorney, Agent, or Firm*—Robert E. Bushnell, Esq.

(57) ABSTRACT

A power saving apparatus of a monitor which is capable of reducing power consumption in a monitor by controlling the power supplied to a signal sensor in a power saving mode and a controlling method thereof are provided. The power saving apparatus includes a power supply unit which supplies operational power to the signal sensor, which senses an input state of a video synchronization signal input into thereto and generates data based on the input. A microprocessor determines whether the monitor is in a power saving mode or a normal mode based on the data generated by the signal sensor, and then cuts off the power supplied to the signal sensor if the monitor is determined to be in a power saving mode. The power is intermittently resupplied to and cut off from the signal sensor during the power saving mode.

12 Claims, 2 Drawing Sheets

APPARATUS AND METHOD FOR CONSERVING POWER IN A MONITOR

CLAIM OF PRIORITY

This application makes reference to, incorporates the same herein, and claims all benefits accruing under 35 U.S.C. § 119 from my application APPARATUS FOR SAVING POWER IN MONITOR AND METHOD THEREOF filed with the Korean Intellectual Property Office on Jul. 14, 2001 and there duly assigned Ser. No. 42599/2001.

BACKGROUND OF THE INVENTION

1. Field of the Invention

The present invention relates to a power control system of a monitor, and more particularly, to an apparatus and a method for conserving power in a monitor by controlling the power supplied to a signal sensor.

2. Description of the Related Art

There have been efforts for reducing power consumed by electric and electronic products, to decrease the consumption of electric energy generated using the oil and atomic power and for reducing environmental pollution. Among these electric and electronic products, a display device, a peripherical device of a computer system, uses high voltage so that lots of efforts have been made to reduce its power consumption.

In general, monitors are peripheral devices connected to a computer system for displaying information input by a user or data generated in a computer on their screens. In order to reduce power consumption in such monitors, the screens of the monitors must automatically turn off when not being used.

Generally, a display device comprises control means for saving consumption power. In one approach, the control means maybe implemented by a Display Power Management System (DPMS) mode, proposed by Video Electronics Standard Association (VESA) in U.S.A.

The DPMS mode functions to manage power of a display device, which is one of the peripheral devices of a computer, according to a used state of the computer to save the power.

In conformity with the VESA, the computer selectively supplies or blocks horizontal and vertical synchronous signals to the display device according to its used state, and the display device manages power according to the presence of the horizontal and vertical synchronous signals from the computer.

The power management states are classified into an on state, a stand-by state, a suspend state and a power off state. Both the horizontal and vertical synchronous signals are applied at the on state, and only the vertical synchronous signal is applied at the stand-by state. Only the horizontal synchronous signal is applied at the suspend state, and either the horizontal or vertical synchronous signal is not applied at the power off state.

The power management state is sequentially changed to the on state stand-by state suspend state power off state with the continuous lapse of unused time of the computer. It is commonly prescribed that consumption power of the display device be about 80 W at the on state, 65 W or less at the stand-by state, 25 W or less at the suspend state and 5 W or less at the power off state.

SUMMARY OF THE INVENTION

It is a first object of the present invention to provide a power saving apparatus in a monitor, which is capable of maximizing the amount of power conserved by cutting the power supplied to a signal sensor at predetermined time intervals during a power saving mode.

It is a second object of the present invention to provide a method for controlling monitor power for the above power saving apparatus.

Accordingly, to achieve the first object, there is provided a power saving apparatus in a power control system of a monitor. The power saving apparatus includes a power supply unit which supplies operational power to each block of the monitor, including, a signal sensor which senses a video synchronization signal input into the signal sensor and generates data regarding the input state of a signal, a signal driver which converts a video signal into a display driving signal, a display which displays the video signal that is converted in the signal driver on a screen, and a microprocessor which determines whether a monitor is in a power saving mode or a normal mode based on whether or not a synchronization signal exists in the data on the input state of a signal generated by the signal sensor and then cuts off the power supplied from the power supply unit to the various blocks, and cutting power to the signal sensor at predetermined time intervals if the monitor is determined to be in a power saving mode.

To achieve the second object, there is provided a method for controlling the power of a monitor including determining whether the monitor is in a power saving mode or a normal mode based on whether or not horizontal or vertical video synchronization signals exist, and cutting operational power of blocks of the monitor and simultaneously supplying power to a signal sensor, which senses signal input, and cutting power from the signal sensor at predetermined time intervals if the monitor is determined to be in a power saving mode, and supplying power to each of the blocks of the monitor if the monitor is determined to be in a normal mode.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
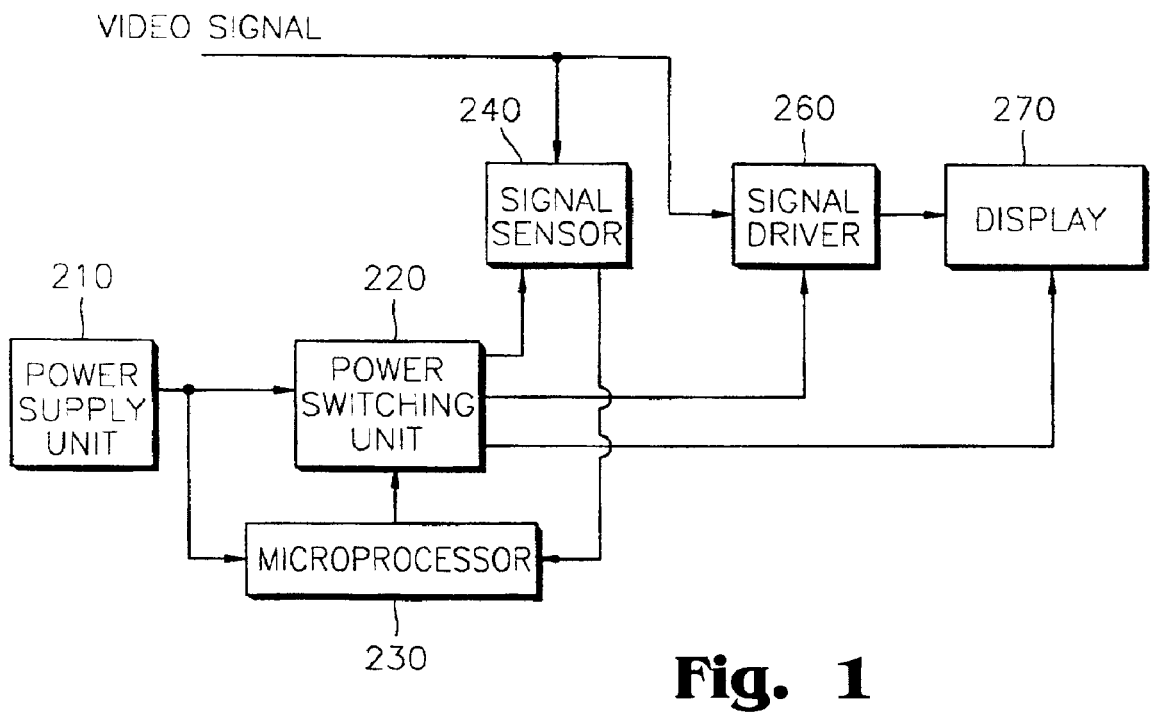
FIG. 1 is a block diagram illustrating a power saving apparatus of a monitor according to the present invention.

Referring to FIG. 1, a power saving apparatus of a monitor includes a power supply unit 210, a power switching unit 220, a microprocessor 230, a signal sensor 240, a signal driver 260 and a display 270 . The signal sensor 240, the signal driver 260, and the display 270 are connected to the power switching unit 220 and all are controlled by the microprocessor 230.

The power supply unit 210 supplies power to each block of a monitor using a power converter, such as an AC/DC adaptor or a DC/DC converter.

The signal sensor 240 detects a video (horizontal and/or vertical) synchronization signal input thereto and senses whether or not a signal is received. At the same time, the signal sensor 240 generates data regarding the input state of the video synchronization signal, such as the width of the video synchronization signal, the period of the video synchronization signal, or whether or not the video synchronization signal exists.

The signal driver 260 receives a video signal and converts the video signal into a display driving signal to be applied to the display 270. The display 270 may be a CRT or LCD for displaying the video signal converted in the signal driver 260 on a screen.

The power switching unit 220 simultaneously or sequentially switches power supplied from the power supply unit 210 to the signal sensor 240, the signal driver 250, and the display 260 according to a switching control signal of the microprocessor 230.

The microprocessor 230 identifies whether or not the horizontal synchronization signal and/or the vertical synchronization signal exist using the data received from the signal sensor 240 regarding the input state of the video synchronization signal. If the monitored synchronization signal exists, a monitor is determined to be in a normal mode by the microprocessor 230. If the monitored synchronization signal is absent, a monitor is determined to be in a power saving mode by the microprocessor 230.

In a power saving mode, the microprocessor 230 controls power switching unit 220 to cut off the power supplied from the power supply unit 210 to the signal driver 260 and the display 270. Additionally, the microprocessor 230 controls power switching unit 220 to cut off the power supplied from the power supply unit 210 to the signal sensor 240 at predetermined time intervals. On the other hand, in a normal mode, the microprocessor 230 allows power to be supplied from the power supply unit 210 to the signal sensor 240, the signal driver 260, and the display 270.

Therefore, in the power saving mode, the microprocessor 230 controls the period of time for which power is supplied from the power supply unit 210 to the signal sensor 240 and the period of time for which the power supplied from the power supply unit 210 to the signal sensor 240 is cut-off. Accordingly, in the power saving mode, the signal sensor 240 is capable of sensing a video synchronization signal input thereto by using the power supplied at predetermined time intervals.

Figure 2:
FIG. 2 is a timing diagram illustrating time periods during which power is supplied and cut-off as controlled by the power saving apparatus shown in FIG. 1.

FIG. 2 is a timing diagram illustrating the time periods corresponding to when power is supplied to and cut-off from the signal sensor 240, as controlled by microprocessor 230 and power switching unit 220 shown in FIG. 1.

Referring to FIG. 2, $t_a$ represents the time period during which power is supplied to the signal sensor 240, and $t_b$ represents the time period during which the power supplied to the signal sensor 240 is cut-off. As shown, the microprocessor 230 controls and power switching unit 220 to provide and cuts off the power supplied to the signal sensor 240 at predetermined time intervals in a power saving mode. Preferably, the period of time for which the power supplied to the signal sensor is cut-off is longer than the period of time for which power is supplied to the signal sensor 240.

Figure 3:
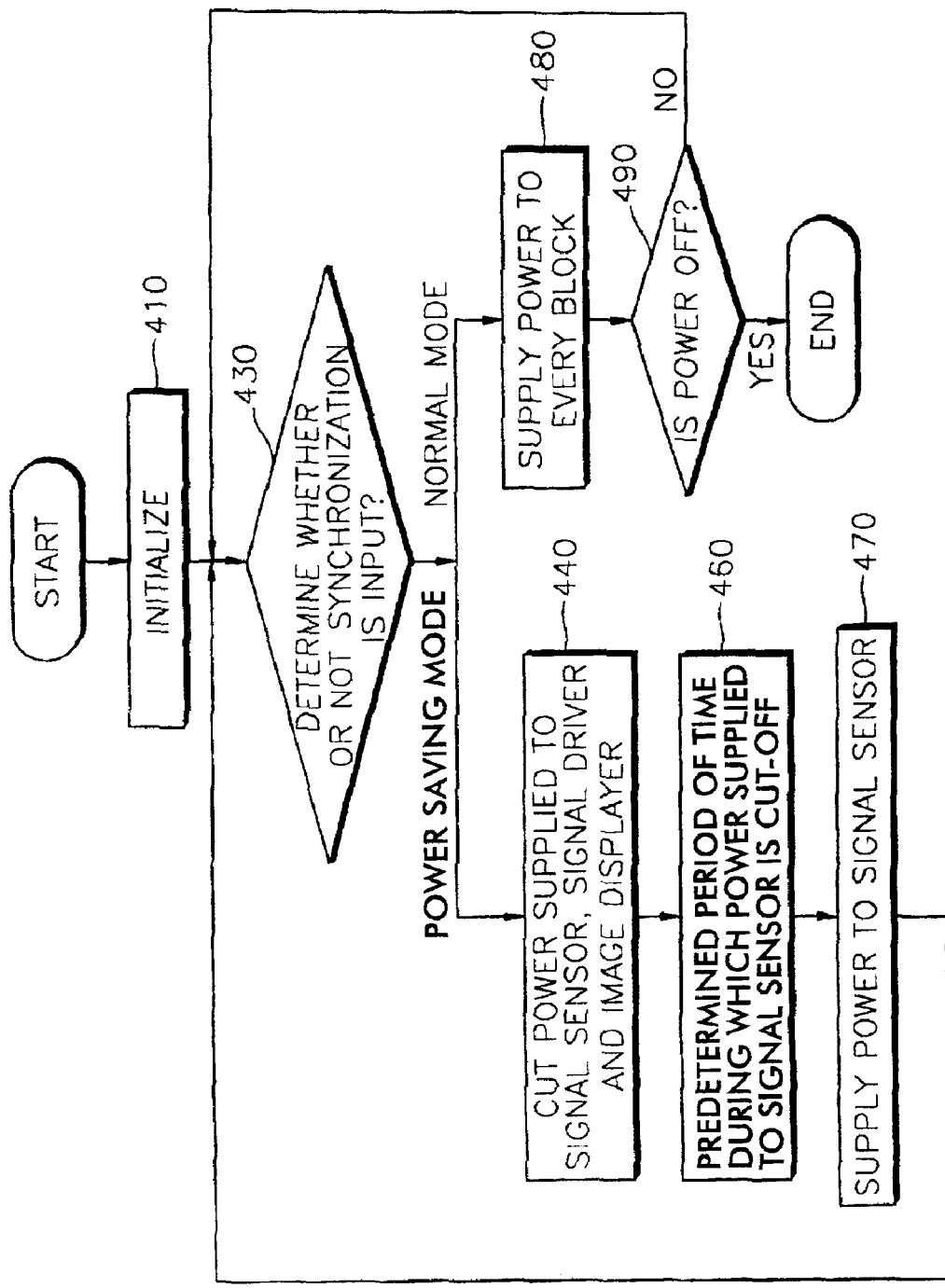
FIG. 3 is a flow chart illustrating a method for controlling the power of a monitor according to the present invention.

FIG. 3 is a flow chart illustrating a method for controlling the power of a monitor according to the present invention. In step 410, a register of the microprocessor 230 is initialized when power is turned on.

In step 430, it is determined whether a monitor is in a power saving mode or a normal mode by detecting whether or not a video synchronization signal, such as the horizontal synchronization signal and/or the vertical synchronization signal, are input to signal sensor 240. The result of the determination made by signal sensor 240 is stored in the register of microprocessor 230. Accordingly, the value stored in the register is determinative of whether a monitor is in a power saving mode or a normal mode.

If the monitor is determined to be in a power saving mode, the power supplied to the signal sensor 240, the signal driver 260, and the display 270 are simultaneously or sequentially cut-off in step 440. Next, after a predetermined period of time (period $t_b$ of FIG. 2) during which the power supplied to the signal sensor 240 is cut-off in step 460, power is supplied to the signal sensor 240 for another predetermined period of time (period $t_a$ of FIG. 2) in step 470. The steps 430 through 470 are continuously repeated until it is determined in step 430 that the mode has changed from the power saving mode to the normal mode.

If the monitor is determined to be in a normal mode in step 430, power is simultaneously or sequentially supplied to the signal sensor 240, the signal driver 260, and the display 270 in step 480, and then the power supply to the signal sensor 240, the signal driver 260, and the display 270 is maintained until the power is turned off in step 490 or it is determined in step 430 that the monitor is in the power saving mode.

As described above, according to the present invention, it is possible to maximize the amount of power conserved in a monitor power device by additionally controlling the power supplied to a signal sensor, which is not controlled in the prior art, in a power saving mode.

What is claimed is:

1. A power saving apparatus in a power control system of a monitor, the power saving apparatus comprising:
   a power supply unit which supplies power to each block of the monitor;
   a signal sensor which senses a video synchronization signal input into the signal sensor and generates data based on an input state of the video synchronization signal;
   a signal driver which converts a video signal into a display driving signal;
   a display which displays the video signal, in response to the display driving signal, on a screen; and
   a microprocessor which determines whether the monitor is in a power saving mode or a normal mode based on the data generated by the signal sensor, said microprocessor permitting the power to be supplied to said signal sensor, said signal driver and said display when it is determined that the monitor is in the normal mode, said microprocessor cutting off the power supplied from the power supply unit to said signal sensor, said signal driver and said display when it is determined that the monitor is in the power saving mode, said microprocessor permitting power to be resupplied to said signal sensor after a first predetermined time interval during said power saving mode.

2. The power saving apparatus as set forth in claim 1, wherein said microprocessor permits the power to be resupplied to said signal sensor for a second predetermined time interval, during said power saving mode, and then again cuts off the power to said signal sensor, said first predetermined time interval being longer than said second predetermined time interval.

3. The power saving apparatus as set forth in claim 2, wherein said microprocessor permits the power to be resupplied to said signal sensor, said signal driver and said display when it is determined that the monitor returns to the normal mode.

4. The power saving apparatus as set forth in claim 1, further comprising a power switching unit interposed between power supply unit and said signal sensor, said signal driver and said display, said power switching unit being controlled by said microprocessor to control when the power is supplied from the power supply unit to said signal sensor, said signal driver and said display.

5. The power saving apparatus as set forth in claim 4, wherein said microprocessor controls said power switching unit to permit the power to be resupplied to said signal sensor for a second predetermined time interval, during said power saving mode, and then again cuts off the power to said signal sensor, said first predetermined time interval being longer than said second predetermined time interval.

6. The power saving apparatus as set forth in claim 5, wherein said microprocessor controls said power switching unit to permit the power to be resupplied to said signal sensor, said signal driver and said display when it is determined that the monitor returns to the normal mode.

7. A method for controlling the power of a monitor, comprising the steps of:

determining whether the monitor is in a power saving mode or a normal mode based on whether or not a video synchronization signal is received by a signal sensor;

permitting operational power to be supplied to said signal sensor when it is determined that said monitor is in the normal mode; and intermittently cutting off and resupplying the operational power to said signal sensor, when it is determined that said monitor is in the power saving mode.

8. The method as set forth in claim 7, wherein the operational power to said signal sensor is cut off for a first predetermined time period and resupplied for a second predetermined time period.

9. The method as set forth in claim 8, wherein said first predetermined time period is longer than said second predetermined time period.

10. A power saving apparatus in a power control system of a monitor, the power saving apparatus comprising:

a power supply unit which supplies power for each block of the monitor;

a signal sensor which senses a video synchronization signal input into the signal sensor and generates data based on an input state of the video synchronization signal;

a signal driver which converts a video signal into a display driving signal;

a display which displays the video signal, in response to the display driving signal, on a screen;

a power switching unit through which the power supplied by said power supply unit is selectively supplied to said signal sensor, said signal driver and said display; and a microprocessor which determines whether the monitor is in a power saving mode or a normal mode based on the data generated by the signal sensor, said microprocessor controlling said power switching unit to permit the power to be supplied to said signal sensor, said signal driver and said display when it is determined that the monitor is in the normal mode, said microprocessor controlling said power switching unit to cut off the power supplied to said signal sensor, said signal driver and said display when it is determined that the monitor is in the power saving mode, said microprocessor controlling said power switching unit to permit power to be resupplied to said signal sensor after a first predetermined time interval during said power saving mode.

11. The power saving apparatus as set forth in claim 10, wherein said microprocessor controls said power switching unit to permit the power to be resupplied to said signal sensor for a second predetermined time interval, during said power saving mode, and then again cuts off the power to said signal sensor, said first predetermined time interval being longer than said second predetermined time interval.

12. The power saving apparatus as set forth in claim 11, wherein said microprocessor controls said power switching unit to permit the power to be resupplied to said signal sensor, said signal driver and said display when it is determined that the monitor returns to the normal mode.

* * * * *